(12) United States Patent
Peltonen et al.

(10) Patent No.: US 7,716,211 B2
(45) Date of Patent: May 11, 2010

(54) SYSTEM AND METHOD FOR FACILITATING FULL TEXT SEARCHING UTILIZING INVERTED KEYWORD INDICES

(75) Inventors: Kyle G. Peltonen, Issaquah, WA (US); Michael M. H. Cheng, Bellevue, WA (US); David J. Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 10/775,749

(22) Filed: Feb. 10, 2004

(65) Prior Publication Data
US 2005/0177554 A1    Aug. 11, 2005

(51) Int. Cl.
*G06F 7/00* (2006.01)
(52) U.S. Cl. ............... 707/715; 707/713; 707/736; 707/741; 707/742
(58) Field of Classification Search ......... 707/3, 707/1
See application file for complete search history.

(56) References Cited

U.S. PATENT DOCUMENTS

| 7,043,472 | B2* | 5/2006 | Aridor et al. | 707/3 |
| 7,069,272 | B2* | 6/2006 | Snyder | 707/102 |
| 7,149,748 | B1* | 12/2006 | Stephan | 707/102 |
| 2003/0149687 | A1* | 8/2003 | Brown et al. | 707/3 |
| 2004/0098381 | A1* | 5/2004 | Parikh et al. | 707/3 |
| 2004/0103075 | A1* | 5/2004 | Kim et al. | 707/1 |
| 2005/0060304 | A1* | 3/2005 | Parikh | 707/3 |
| 2005/0177554 | A1* | 8/2005 | Peltonen et al. | 707/3 |
| 2005/0228797 | A1* | 10/2005 | Koningstein et al. | 707/100 |

* cited by examiner

*Primary Examiner*—Hung Q Pham
(74) *Attorney, Agent, or Firm*—Merchant & Gould; Ryan T. Grace (57) ABSTRACT

A system and method for facilitating full text searching utilizing inverted keyword indices in shared memory are provided. An inverted keyword index and an inverted keyword attribute index are created from keyword tokens from a set of documents. The keyword indices are stored in a shared memory buffer and accessed by a query processing component. Shared memory pointers corresponding to the indices are dynamically adjusted according to the addressing schema of the query processing component. The query processing component then processes data queries from the keyword indices stored in the shared memory buffer.

14 Claims, 12 Drawing Sheets

SYSTEM AND METHOD FOR FACILITATING FULL TEXT SEARCHING UTILIZING INVERTED KEYWORD INDICES

FIELD OF THE INVENTION

In general, the present invention relates to computer software, and in particular, to a system and method for facilitating full text searching of data utilizing an inverted keyword index and an inverted keyword attribute index.

BACKGROUND OF THE INVENTION

Information retrieval, in the form of full text searching, is a rapidly growing aspect of the function of most computer systems. The ability to efficiently conduct full text searches is a crucial component for computer systems in both local area network settings, such as an intranet, and wide area network settings, such as the Internet.

Generally described, full text searching can be facilitated through one or more indexes that can be queried. In a typical embodiment, a computer system can include a data parsing/index generating component that extracts information from a data set. The data parsing/index generation component then generates one or more searchable indices correspond to an analysis of the data set. For example, in one approach, the component generates an inverted keyword index that tracks keywords as they are found in the set of data. Additionally, the computer system can include a query engine that receives the index from the data parsing/index generating component and subsequently processes data queries.

Although components and data structures such as the data parsing/index generating component, the query engine and the keyword indices can facilitate full text searching, traditional implementations of these components and data structures can become deficient for a variety of reasons. In one aspect, scaling issues can occur as querying of traditional keyword indices becomes more inefficient with the size of the index. In another similar aspect, the passing of keyword index data between the data parsing/index generating component and the query engine can result in an increased burden on system memory resources. In a further aspect, traditional interoperability between the data parsing/index generating component and the query engine can often result in a delay of the availability of updated indexes for searching by the query engine.

Thus, there is a need for a system and method for facilitating full text searching utilizing inverted keyword indices that can improve scalability and process interoperability.

SUMMARY OF THE INVENTION

A system and method for facilitating full text searching utilizing inverted keyword indices in shared memory are provided. An inverted keyword index and an inverted keyword attribute index are created from keyword tokens from a set of documents. The keyword indices are stored in a shared memory buffer and accessed by a query processing component. Shared memory pointers corresponding to the indices are dynamically adjusted according to the addressing schema of the query processing component. The query processing component then processes data queries from the keyword indices stored in the shared memory buffer.

In accordance with an aspect of the present invention, a method for facilitating full text searching of a set of data is provided. In accordance with the method, a query engine obtains keyword data corresponding to a set of data and generates an inverted keyword index corresponding to the keyword data. The query engine component stores the inverted keyword index in a shared process memory. The query engine component obtains a keyword query from a first process and processes the keyword query from the inverted keyword index in a shared memory.

In accordance with another aspect of the present invention, a method for facilitating full text searching of a set of data is provided. In accordance with the method, a query engine obtains keyword data corresponding to a set of data and generates an inverted keyword index and an inverted keyword attribute index corresponding to the keyword data. The query engine stores the inverted keyword index and the inverted keyword attribute index in a shared process memory buffer.

In accordance with a further aspect of the present invention, a system for facilitating full text searching is provided. The system includes one or more processes for issuing keyword queries. The system also includes an index generation component for obtaining a set of data and generating an inverted keyword index and a shared memory buffer for storing the inverted keyword index of a set of data. The system further includes a query processing component for processing keyword queries issued by the one or more processes from the inverted keyword index stored in the shared memory buffer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for facilitating full text searching utilizing an inverted keyword index and an inverted keyword attribute index. More specifically, the present invention relates to a query engine including a data parsing/index generation component for generating an inverted keyword index and an inverted keyword attribute index in a shared process memory. The present invention also relates to a query processing component in the query engine for processing data queries from the indices in the shared memory buffer. The keyword and keyword attribute indices may be in the form of red and black tree indices. Although the present invention will be described with relation to specific data structures and data relationships and specific keyword attribute data, one skilled in the relevant art will appreciate that the disclosed embodiments are illustrative in nature and should not be construed as limiting.

Figure 1:
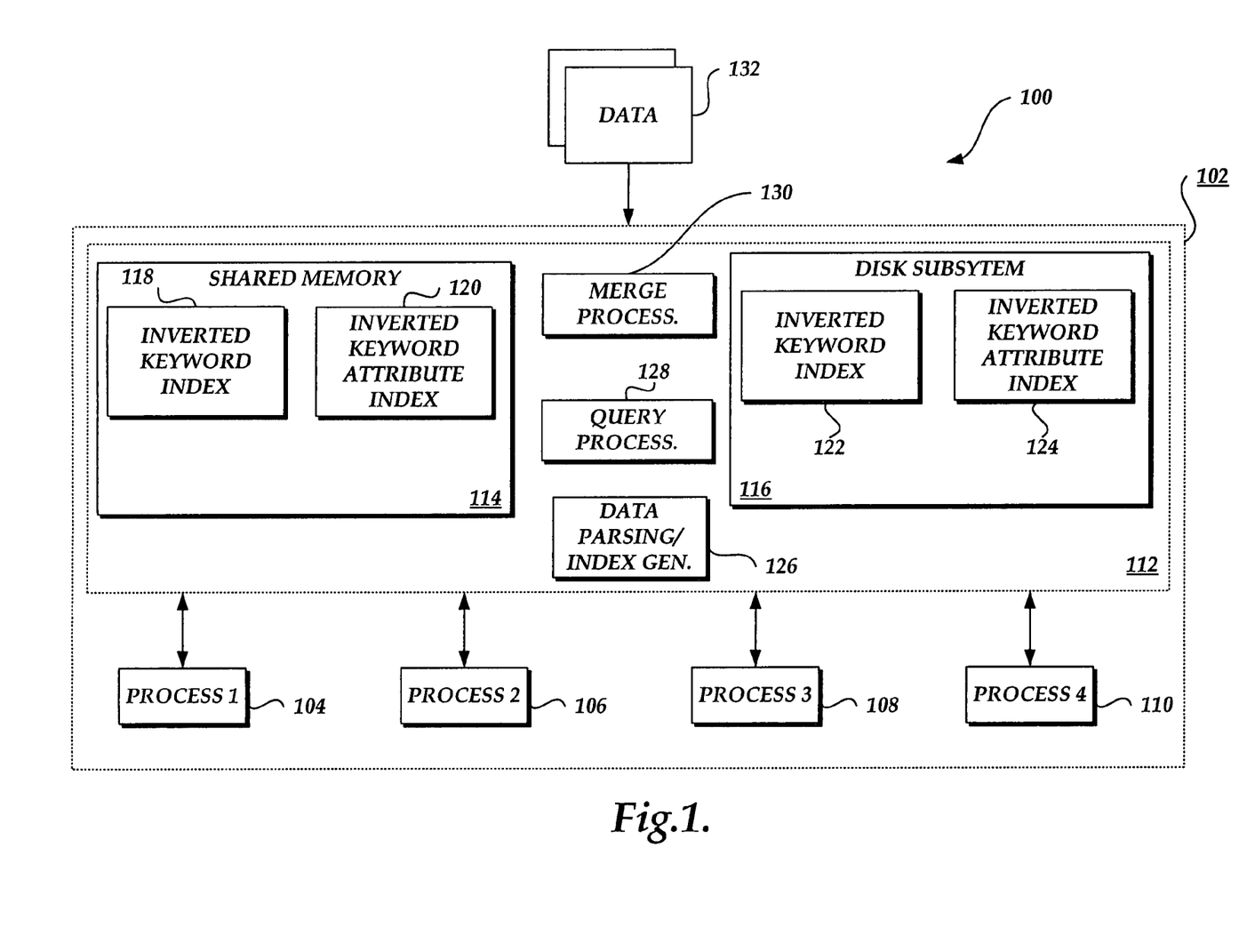
FIG. 1 is a block diagram illustrative of a full text searching system including one or more processes for issuing index generation requests and data queries and a query engine for generating inverted keyword indices and for processing data queries from the one or more processes in accordance with the present invention.

FIG. 1 is a block diagram illustrative of a full text searching system 100 formed in accordance with the present invention. The full text searching system 100 can correspond to an operating environment 102 that includes one or more processes 104, 106, 108 and 110. Each of the processes 104, 106, 108, 110 may issue commands to generate, or update, keyword indices. Further, the processes 104, 106, 108, 110 may issue data queries corresponding to full text searches of a set of documents. Although the operating environment is illustrated as a centralized collection of processes, some or all of the processes may be remotely distributed among various operating environments. Further, each process 104, 106, 108, 110 in the operating environment 102 can correspond to one or more software applications or operating system functions, as will be explained in greater detail below.

The operating environment 102 also includes a query engine 112 for processing the process data queries and for maintaining inverted keyword indices and inverted keyword attribute indices of a set of documents. In an illustrative embodiment of the present invention, the query engine 112 includes a shared memory 114 and a disk subsystem 116 for storing the inverted keyword and inverted keyword attribute indices. As illustrated in FIG. 1, the shared memory 114 and disk subsystem include an inverted keyword index 118, 122 and an inverted keyword attribute index 120, 124. One skilled in the relevant art will appreciate that the inverted keyword index 118, 122 in the shared memory 114 and disk subsystem 116 form a logical inverted keyword index. Likewise, the inverted keyword attribute index 120, 124 in the shared memory 114 and disk subsystem 116 for a logical inverted keyword attribute index. In an illustrative embodiment of the present invention, the information stored in the shared memory 114 corresponds to data recently generated by the query engine 112. Additionally, the information stored in the disk subsystem corresponds to data previously generated by the query engine 112 and optimized for storage. As will be explained in greater detail below, the shared memory 114 and the disk subsystem 116 may be utilized to satisfy full text searching queries issued by one or more processes.

With continued reference to FIG. 1, the query engine 112 also includes a data parsing/index generation component 126 for parsing a set of data to obtain keyword information and for generating inverted keyword index and inverted keyword attribute index information. The query engine 112 further includes a query processing component 128 for processing data queries from the processes 104, 106, 108, 110. As will be described in greater detail below, the query processing component 128 can directly access the inverted keyword index and the inverted keyword attribute index information stored in the shared memory 114 and the disk subsystem 116. Accordingly, the data parsing/index generation component 126 is not required to pass the inverted keyword index and the inverted keyword attribute index information to the query processing component 128. In an illustrative embodiment of the present invention, the query engine 112 can also include a merge process 130 for merging the indices in the shared memory 114 and the disk subsystem 116.

In an illustrative embodiment of the present invention, the set of data 132 can correspond to one or more objects that include searchable data, such as a set of electronic documents, file system contents, Web crawler information, a set of rows in a database, a set of columns in a database, Web page contents, contact information or other personal information and the like. A portion of the set of data 132 may be stored locally by the operating environment 102, such as in a local memory component. Additionally, some portion of the set of data 132 may be distributed and provided to the operating environment 102 via a network connection.

Figure 2:
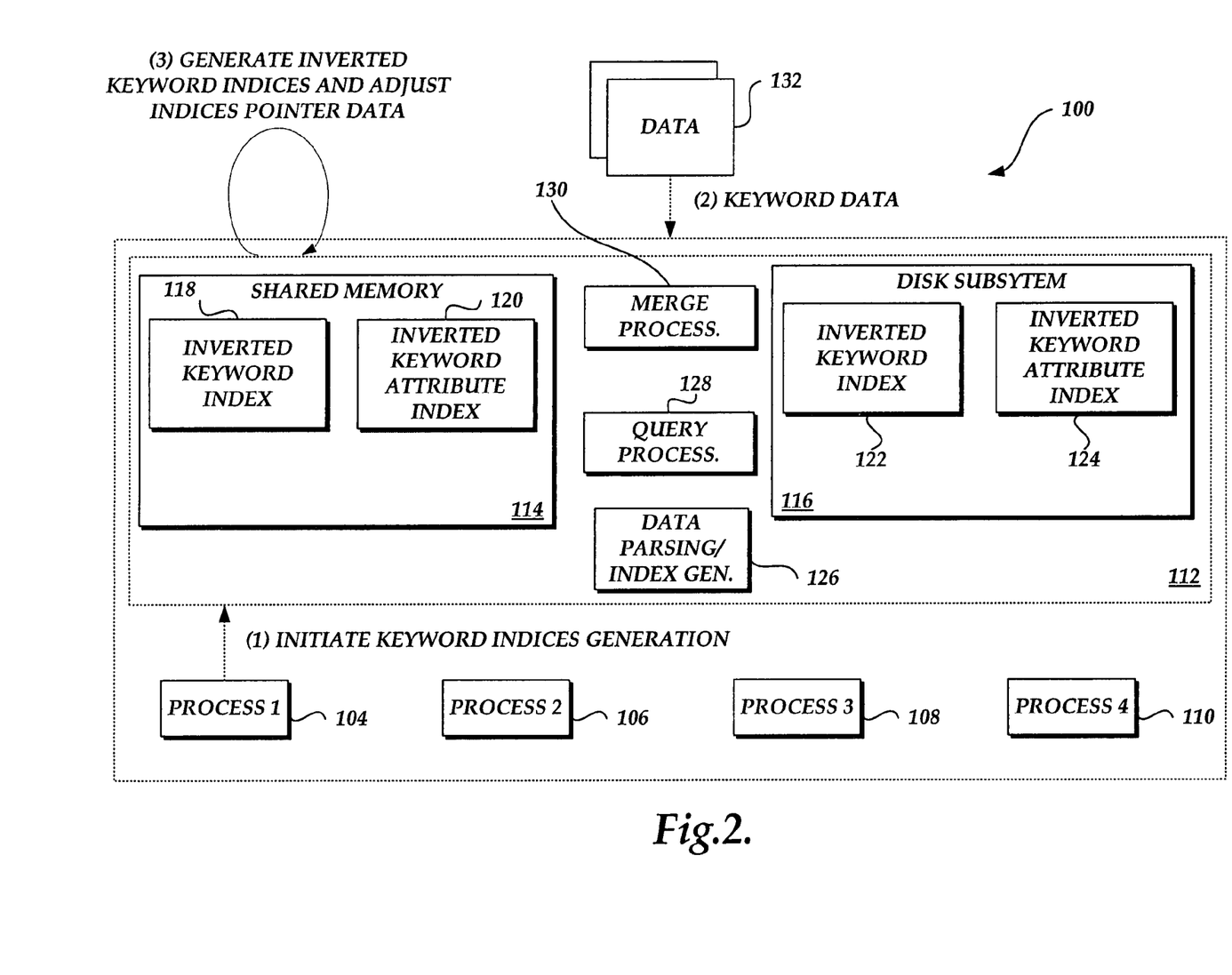
FIG. 2 is a block diagram of the full text searching system of FIG. 1 illustrating the generation of an inverted keyword index and an inverted keyword attribute index by a querying process in accordance with the present invention.
Figure 3:
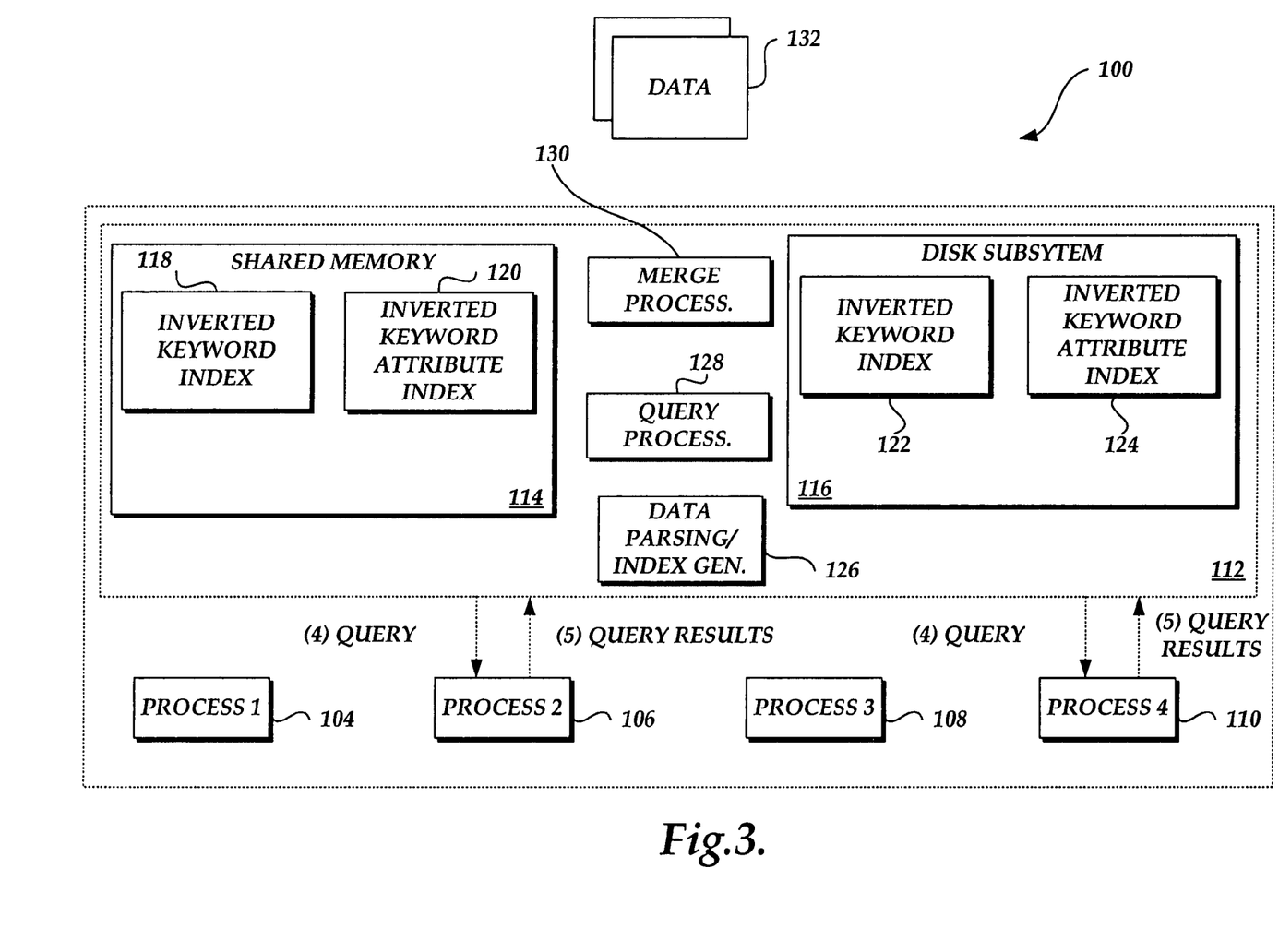
FIG. 3 is a block diagram of the full text searching system of FIG. 1 illustrating the processing of subsequent process data queries and the updating of index pointers in the share memory buffer in accordance with the present invention.

With reference now to FIGS. 2 and 3, an illustrative interaction between the components of the full text searching system 100 will be described. With reference to FIG. 2, a keyword indices generation routine is initiated by a first process 104, such as control process, in the operating environment 102. In an illustrative embodiment of the present invention, the first process 104 may be a control process that instructs the query engine 112 to generate, or update, the inverted keyword and/or the inverted keyword attribute index with an identified set of data 132. The first process 104 request may be generated according to a predetermined schedule, in response to specific criteria, such as the detection of data or the connection of a device to a network, and/or in response to a user initiated command.

In response to the first process initiation, the query engine 112 obtains a set of data to process. As described above, the set of data can correspond to an identified set of data to include in the full text searching set of data. Alternatively, the query engine 112 can initiate a search for new data. Once the set of data is obtained, the data parsing/index generation component 126 generates an inverted keyword index 118 and an inverted keyword attribute index 130 and stores the newly processed information in the shared memory 114. Additionally, the data parsing/index generation component 126 updates pointers in the inverted keyword index 118 and the inverted keyword attribute index 120 according to the addressing schema of the query processing component 128.

With reference now to FIG. 3, once the updated inverted keyword index 118 and the inverted keyword attribute index 120 information is stored in the shared memory 114, the query processing component 128 obtains process data queries from various processes and utilizes the shared memory 114 to process the data queries.

Figure 4:
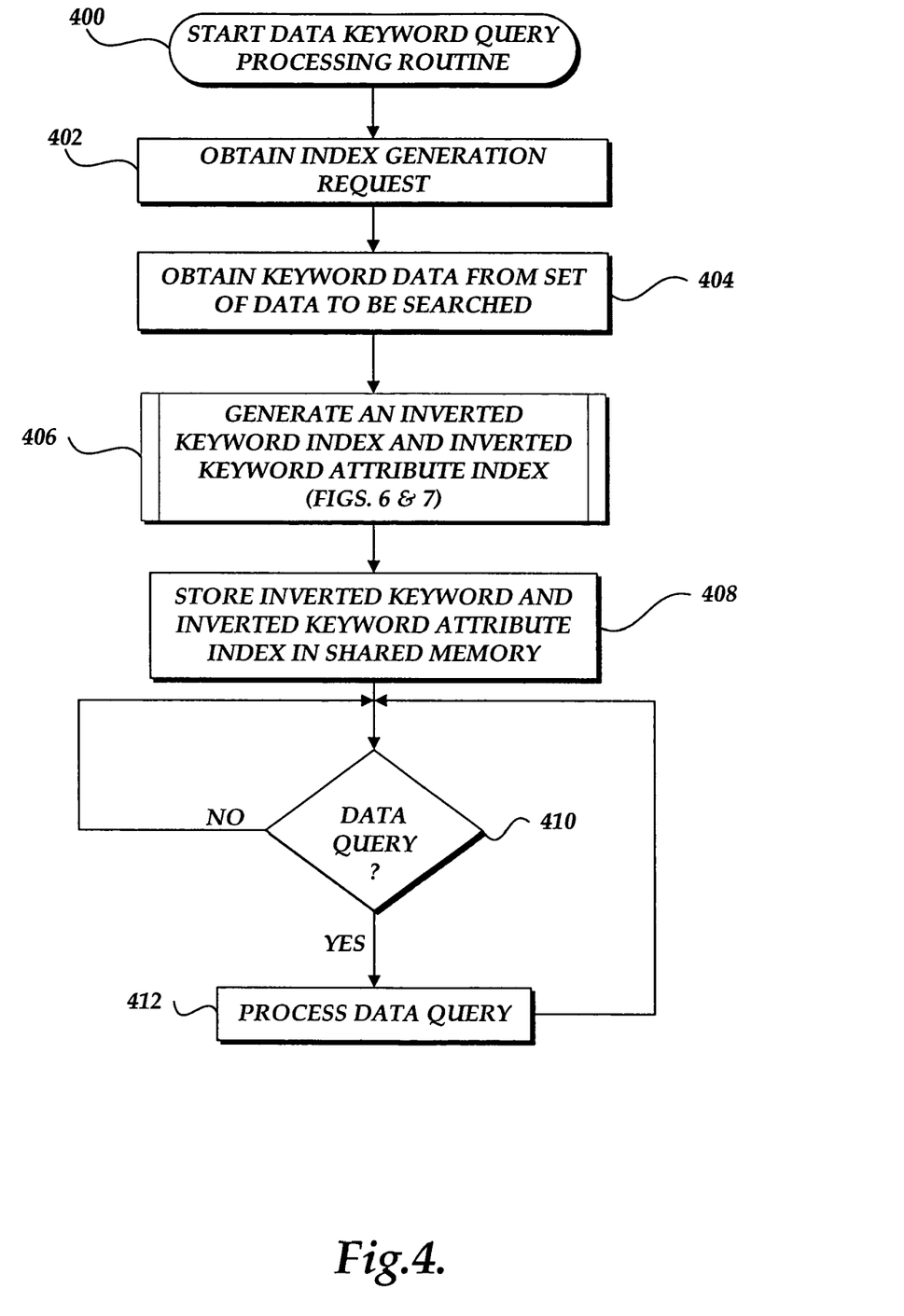
FIG. 4 is a flow diagram illustrative of a keyword query processing routine implemented by a computer system in accordance with the present invention.

With reference now to FIG. 4, a data keyword query processing routine 400 implemented by a computer system having a full text searching system 100 will be described. At block 402, the query engine 112 of the computer system operating environment 102 obtains a request to update keyword information according to a set of documents. As described above, in an illustrative embodiment of the present invention, the request to update keyword information can correspond to a process issued request corresponding to a predetermined schedule of events, an event corresponding to an evaluation of criteria, and/or a user initiated event. At block 404, the data parsing index generation component 126 of the query engine 112 obtains the keyword data from the set of data to be included in the keyword information. In an illustrative embodiment of the present invention, the query engine can have one or more data parsing/index generation components for processing at least a subset of data from the set of data 132 to extract keyword token information from the set of data. For example, a third party supplier may provide a particular component for extracting keyword token information from a proprietary data encoding format. Likewise, an operating environment may have a particular data parsing/index component 128 to process different types of data, such as one component for database files and one component for Web pages. In an illustrative embodiment of the present invention, the keyword token information can include keyword data, such as a text string or a keyword identifier, and one or more keyword attributes. The keyword attributes can include occurrence information corresponding to the location of the keyword within the data. The keyword attributes can also include language information and sentence information that associates the keyword with other keywords in the same sentence. The keyword attributes can further include user ranking/preference information, data timestamp information and other metadata associating properties to the keyword. One skilled in the relevant art will appreciate that additional keyword attribute information may also be extracted from the data.

Once the keyword token information is obtained, at block 406, the data parsing/index generation component 128 generates an inverted keyword index and an inverted keyword attribute index. The generation of the inverted keyword index and an inverted keyword attribute index will be described below with regard to FIGS. 5 and 6. At block 408, the data parsing/index generation component 126 stores the inverted keyword index and an inverted keyword attribute index in the shared memory buffer 114.

At decision block 410, a test is conducted to determine whether there are any process data queries. If so, at block 412, the query processing component 128 processes the query. In an illustrative embodiment of the present invention, the query processing component 128 processes the query from the inverted keyword index 118 and an inverted keyword attribute index 120 in the shared memory buffer 114. Additionally, the query processing component 128 can also process some portion of the query from the inverted keyword index 122 and an inverted keyword attribute index 124 in the disk subsystem 116. Alternatively, the routine 400 returns to decision block 410 to await for further data queries.

Figure 5:
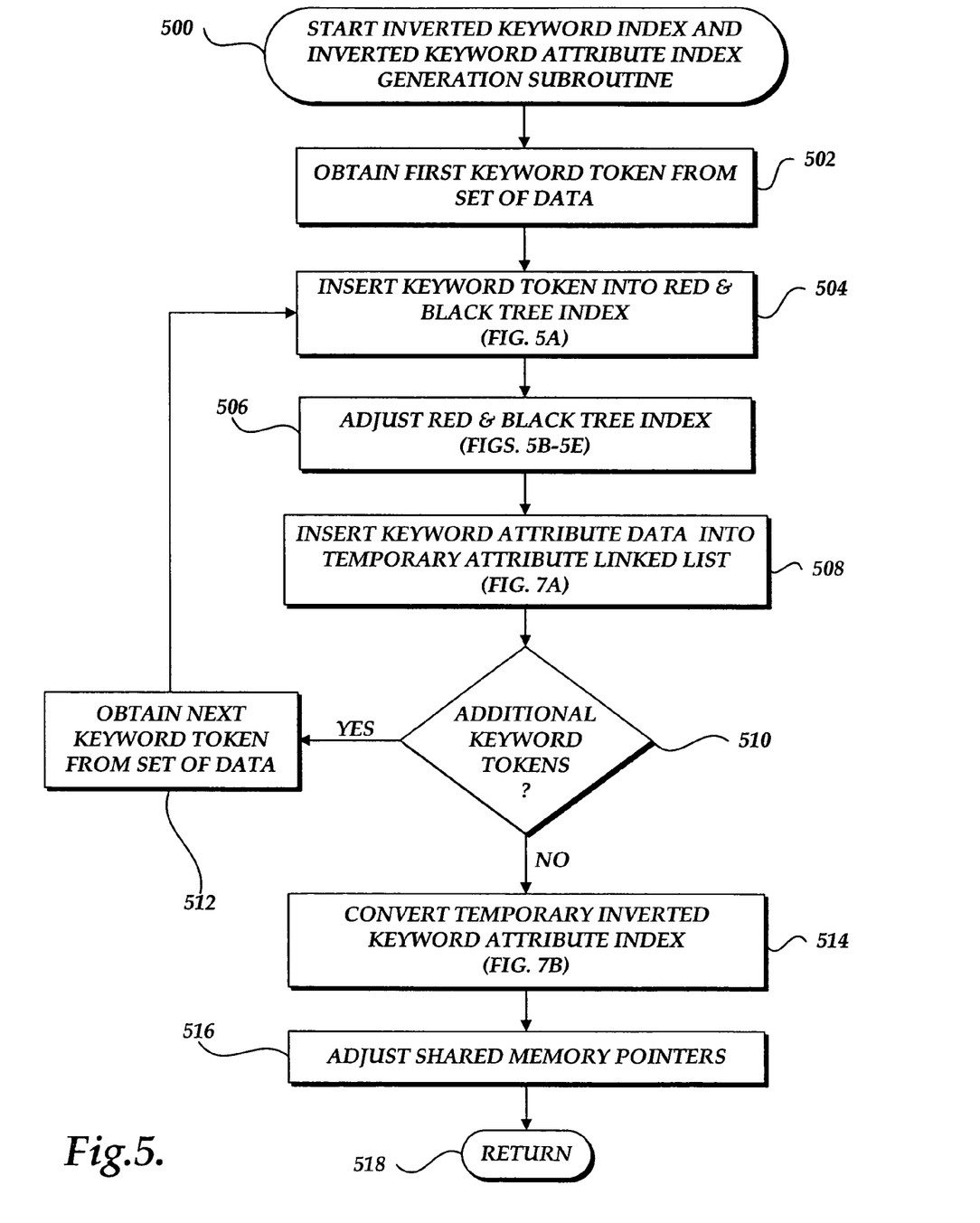
FIG. 5 is a flow diagram illustrative of an inverted keyword index and inverted keyword attribute index generation subroutine in accordance with the present invention.

With reference now to FIG. 5, an inverted keyword index and inverted keyword attribute index generation sub-routine 500 corresponding to block 406 (FIG. 4) will be described. At block 502, the data parsing/index generation component 126 obtains the first keyword token from the set of data 132. As described above, in an illustrative embodiment of the present invention, the data parsing/index generation component 126 can correspond to a set of data parsing/index generation components that are capable of processing various types of data to generate keyword tokens. Further, although the data parsing/index generation component 126 is described with regard to extracting keyword token information corresponding to keyword identifiers and occurrence information from the set of data, additional or alternative information may also be extracted.

At block 504, the data parsing/index generation component 126 inserts the keyword token data as a node in a red and black index tree. Each node includes a pointer to the keyword data in the shared memory buffer 114. One skilled in the relevant art will appreciate that a red and black index tree is binary tree configured such that the size of any branch of the tree will not exceed more than double the length of any other branch in the tree. To achieve this result, red and black index trees have five distinct properties for each node in the tree as follows:

1) Every node in the red and black tree is either red or black.
2) The root of the tree is black.
3) Every leaf in the tree points to a NIL node that is black.
4) If a node is red, then both of its children are black.
5) For each node, all paths from the node to the descendant leaves contain the same number of black nodes.

Figure 6A:
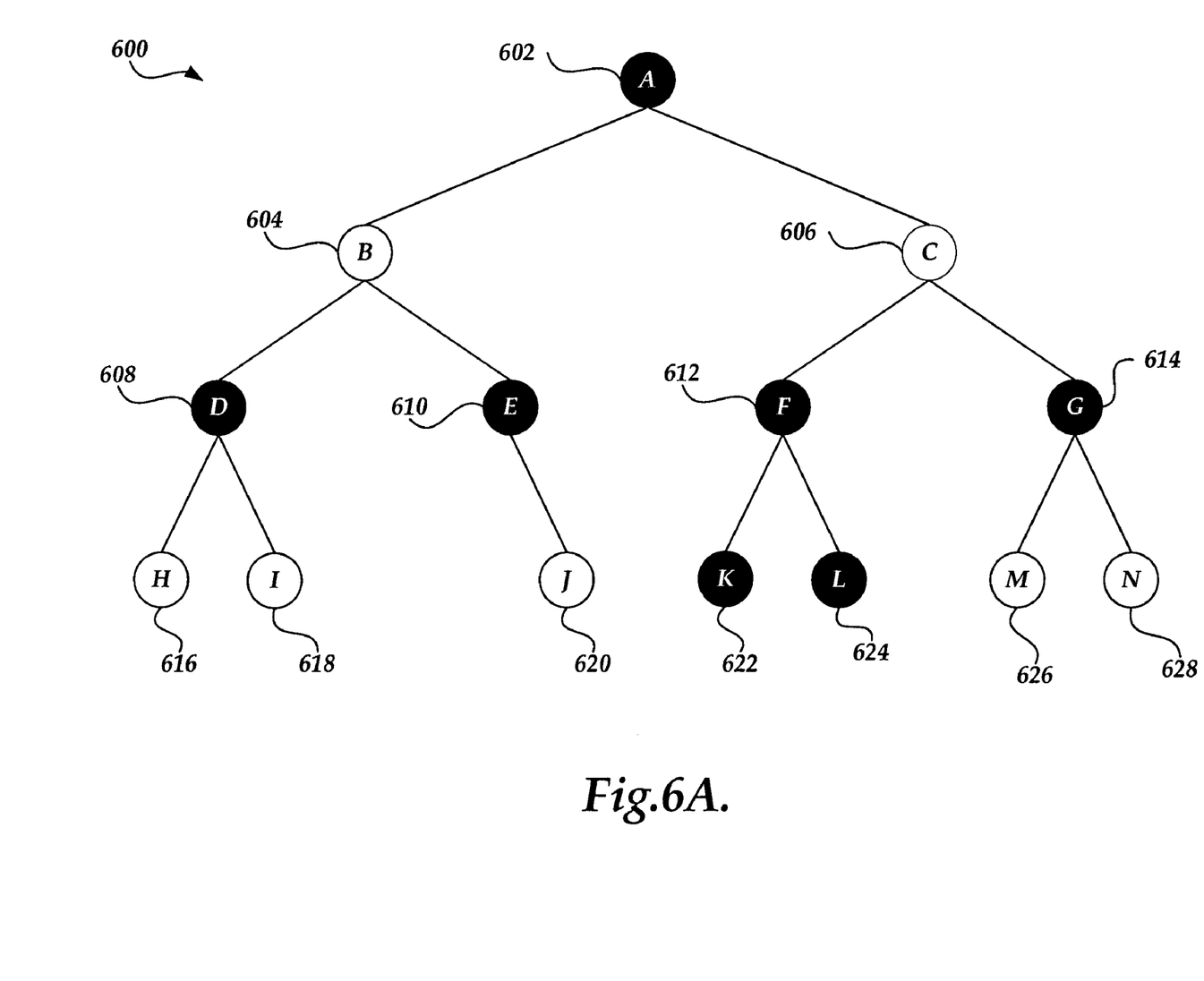
FIGS. 6A-6E are block diagrams illustrative of red and black index tree utilized to store the inverted keyword index and the inverted keyword attribute index data in accordance with the present invention.
Figure 6B:
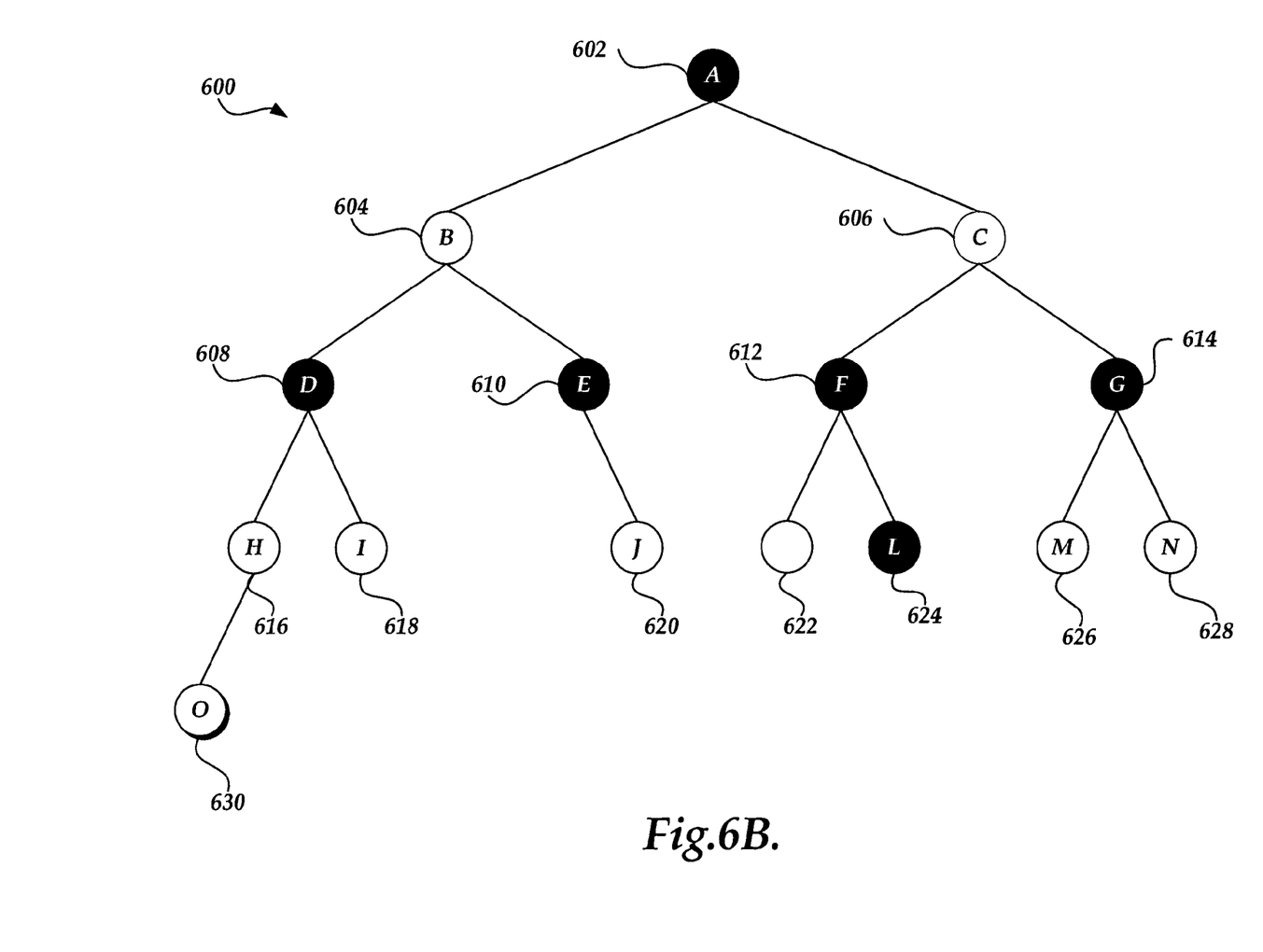

FIGS. 6A-6E are block diagrams of a red and black index tree 600 in accordance with the present invention and will be utilized to show the addition of a node in accordance with sub-routine 500 (FIG. 5). With reference to FIG. 6A, the red and black index tree 600 includes a root node 602, which is black. Root node 602 includes two red children, nodes 604 and 606, which in turn have two black children nodes, 608 and 610 and 612 and 614, respectively. Node 608 and 614 each include two red node children 616 and 618 and 622 and 624, respectively. Node 610 has a single red node 620 and node 612 has no children. Tree 600 satisfies all the requirements of a red and black index tree. With reference now to FIG. 6B, assume that node 630 is added to the tree in accordance with block 504. Further, assume that node 630 is a red node and that it is a child of node 616. Because the parent node is also red, however, the index 600 tree no longer satisfies the properties of a red and black index tree, and will be adjusted as described in greater detail below.

Figure 6C:
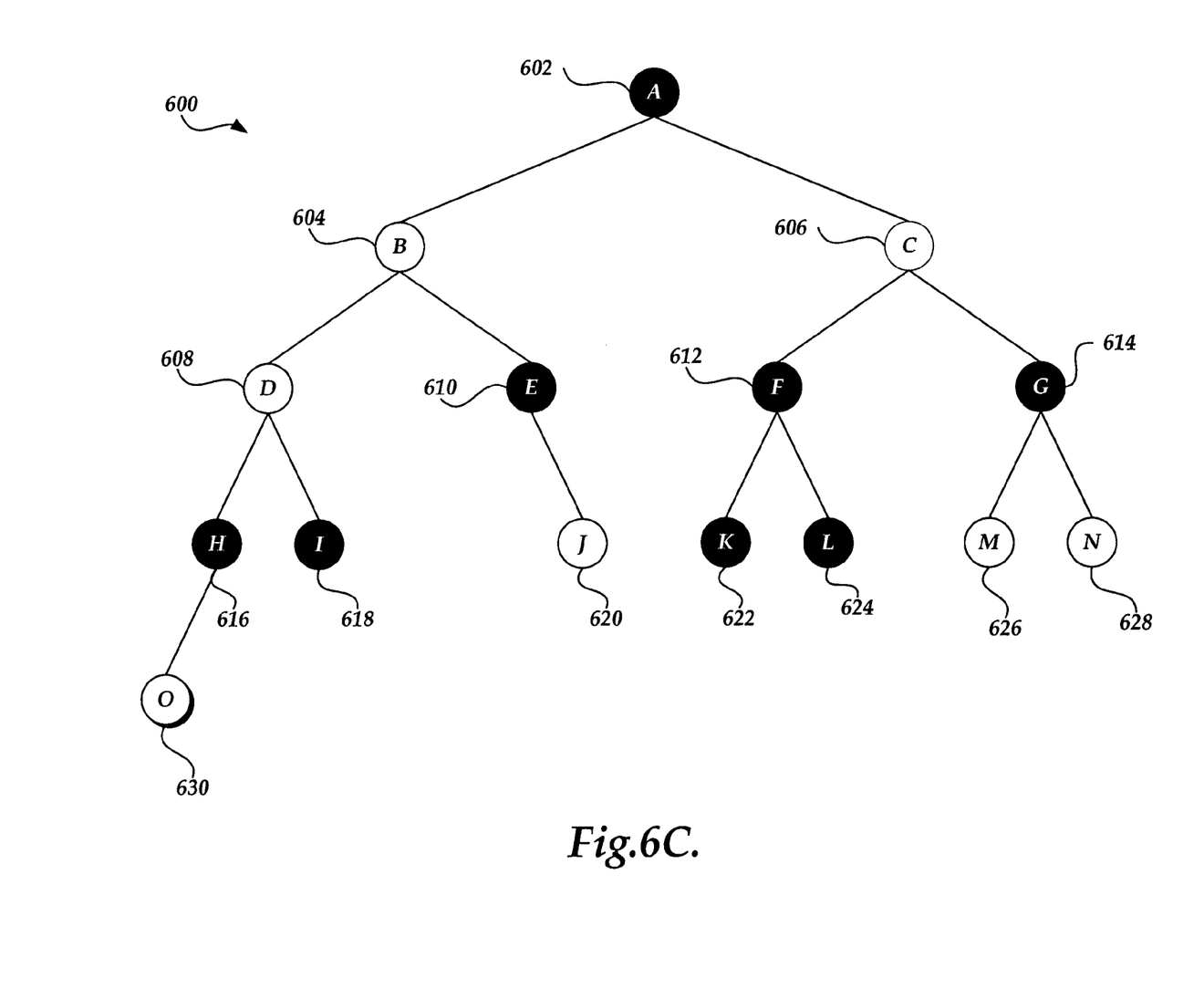
Figure 6D:
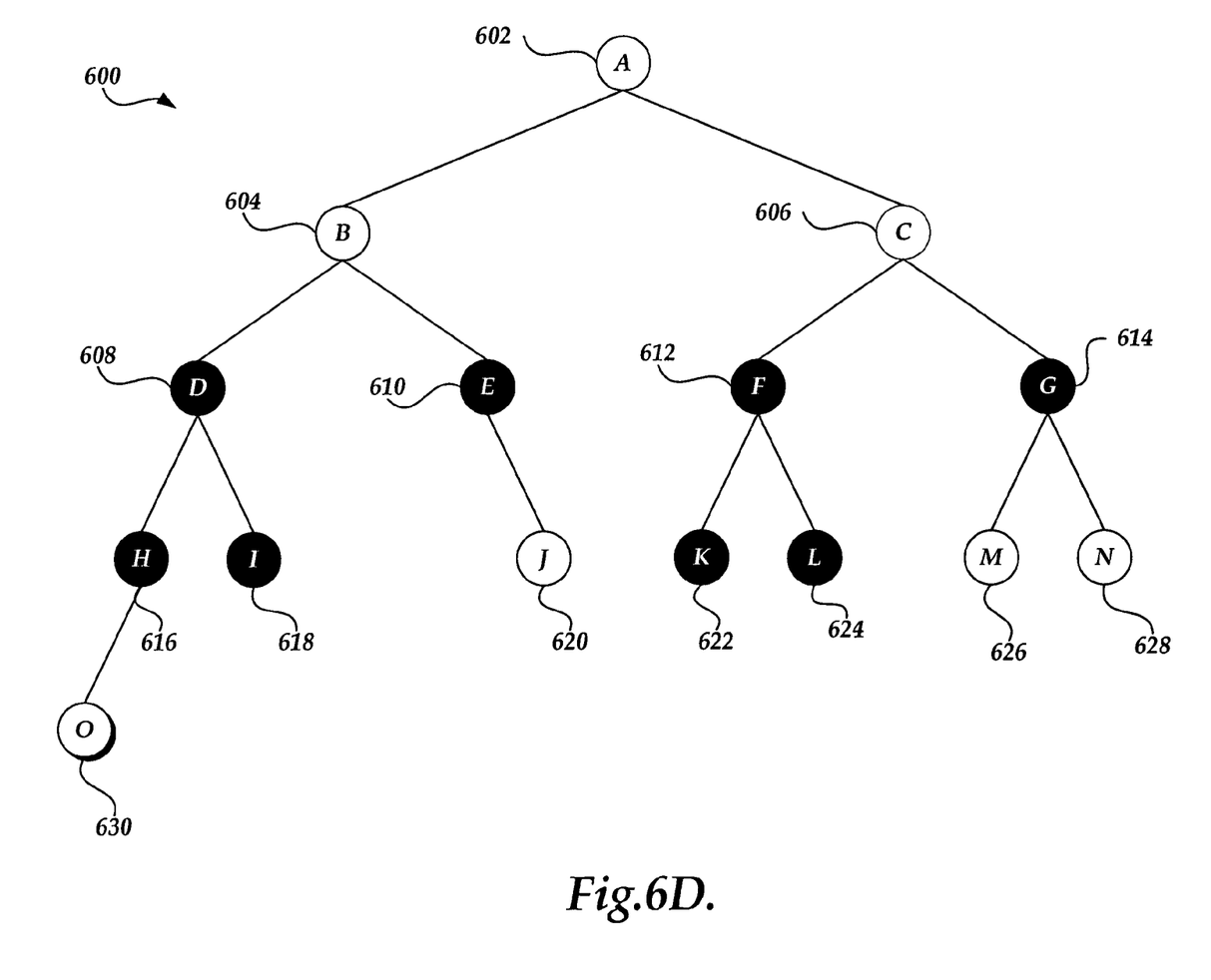
Figure 6E:
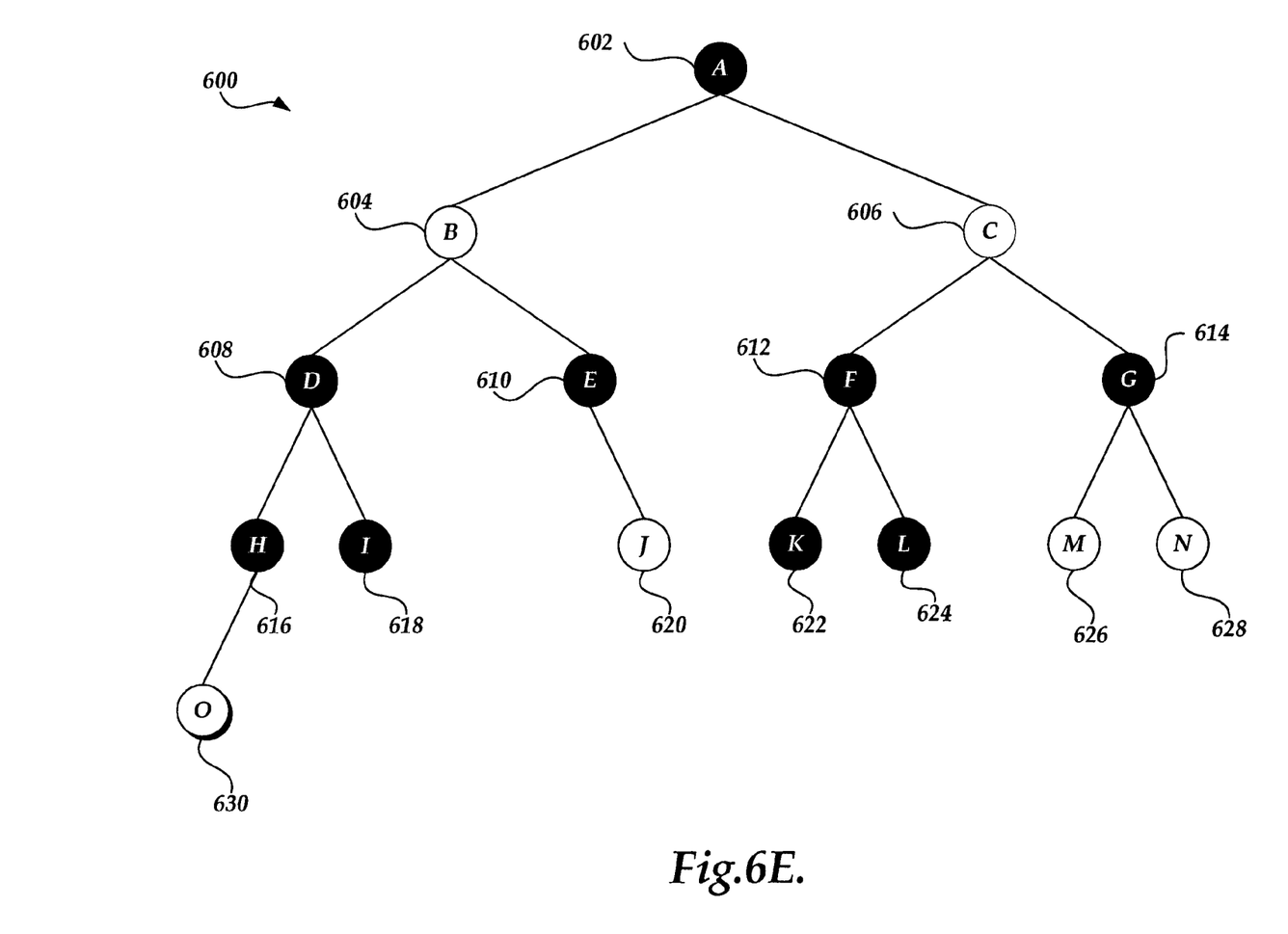

Returning to FIG. 5, at block 506, the data parsing/index generation component 126 adjusts the red and black index tree, if necessary. In an illustrative embodiment of the present invention, the red and black index tree is adjusted by iterating through a process for modifying the color properties and relationships between the nodes. With reference now to FIG. 6C, after the addition of the red node 630, in a first iteration, the red and black index tree 600 is adjusted by modifying the color of node 616 to black and the color of node 608 to red. Although this iteration corrects the initial problem illustrated in FIG. 6B, node 604 is red and now has a red child node 608. Accordingly, the tree 600 still does not satisfy the properties of a red and black index tree. With reference now to FIG. 6D, in a second iteration, the red and black index tree 600 is adjusted by modifying the color of node 608 to black and the color of node 602 to red. Again, although this corrects the problem illustrated in FIGURE C, root node 602 is colored red. Accordingly, the tree 600 still does not satisfy the properties of a red and black index tree. With reference now to FIG. 6E, in a third iteration, the red and black index tree 600 is adjusted by modifying the color of node 602 to black. At this point, the red and black index tree 600 satisfies all the requirements of a red and black index tree and no further adjustment iterations are required. A more detailed analysis of red and black index trees and exemplary routines for adjusting red and black index trees can be found in T. Cormen, "Introduction to Algorithms, Second Edition", MIT Press (2001) which is incorporated by reference herein.

Figure 7A:
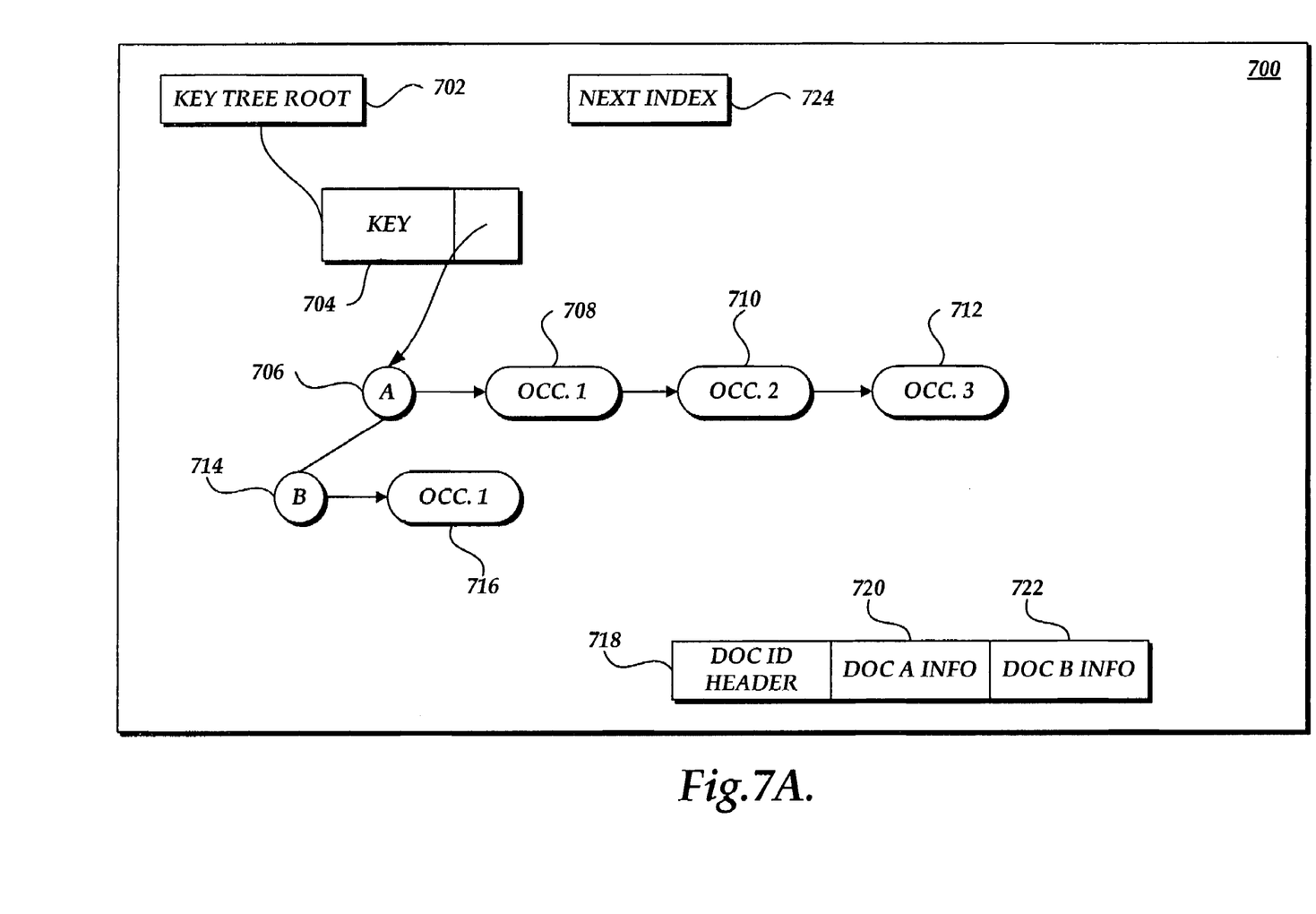
FIG. 7A is a block diagram illustrative of the contents of a shared memory buffer including an inverted keyword index and a temporary inverted keyword attribute index in accordance with the present invention.

Returning again to FIG. 5, once the red and black index tree is adjusted, at block 508, the data parsing/index generation component 126 inserts keyword token attribute data into a temporary inverted keyword attribute index. As described above, in an illustrative embodiment of the present invention, the keyword attribute index information can include occurrence information of the keyword in the set of data. FIG. 7A is a block diagram illustrative of the contents of the shared memory buffer 114 including an inverted keyword index 118 and a temporary inverted keyword attribute index 120 in accordance with the present invention. In an illustrative embodiment of the present invention, the shared memory includes a number of keyword elements that correspond to each entry in the inverted keyword index 118. As illustrated in FIG. 7A, the shared memory buffer 114 includes a key root identifier 702 pointing to the root key node element 704. In turn, the root key node element 704 includes a pointer to a temporary inverted keyword attribute red and black tree index. In an illustrative example, the red and black tree index includes two nodes 706 and 714 corresponding to the occurrence of the keyword in a particular piece of data, such as a document. Each node 706, 714 includes a linked list of occurrences of the keyword within the particular document. For example, node 706 includes a linked list of occurrence information 708, 710 and 712. Node 714 includes a single occurrence information 716. In accordance with the present invention, the linked list of occurrence information allows additional occurrence information to be added as the sub-routine 500 is processed. As also illustrated in FIG. 7A, the shared memory buffer 114 also includes document summary information including a document identification header 718 and document summary information 720 and 722. Further, the shared memory buffer 114 can include a link 724 to additional shared memory buffers.

Figure 7B:
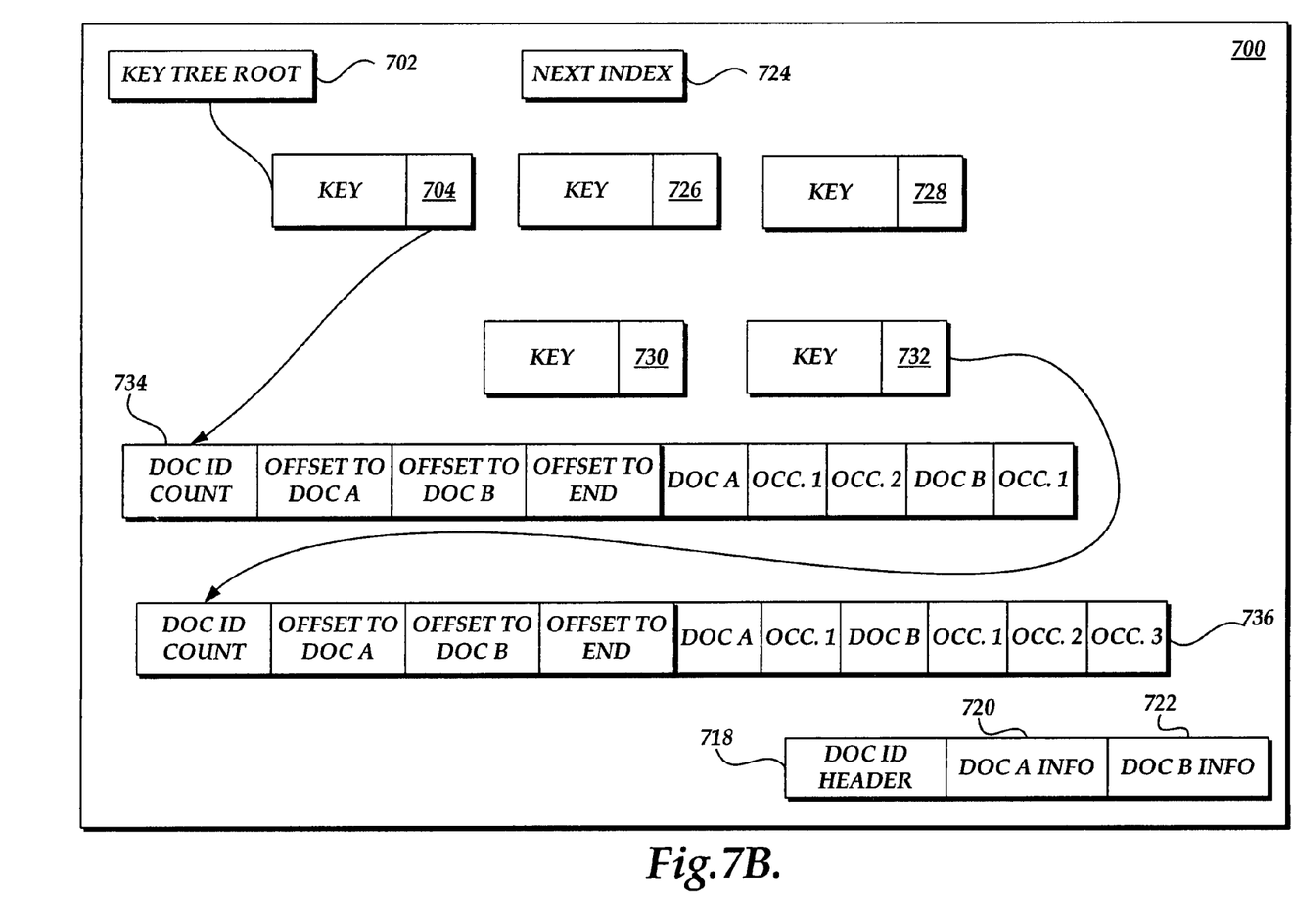
FIG. 7B is a block diagram illustrative of the contents of a shared memory buffer including an inverted keyword index and an inverted keyword attribute index in accordance with the present invention.

Returning to FIG. 5, at decision block 510, a test is conducted to determine whether there is any additional keyword token information from the set of data 132. If there is additional keyword token information, at block 512, the data parsing/index generation component 126 obtains the next keyword token from the set of data 132 and the sub-routine 500 returns to block 504. Alternatively, if there is no additional keyword token information at decision block 510, at block 514, the data parsing/index generation component 126 coverts the temporary inverted keyword attribute index into an optimized attribute list. FIG. 7B is a block diagram of the shared memory buffer 114 of FIG. 7A illustrating the conversion of the temporary inverted attribute index list. As illustrated in FIG. 7B, the buffer contents include additional keyword nodes 726, 728, 730, and 732. Additionally, the temporary red and black tree index for node 704 has been replaced by an optimized list of occurrence information 734. In an illustrative embodiment of the present invention, the optimized list of occurrence information 734 includes a document id count corresponding to the number of documents that the particular keyword was identified. Additionally, the occurrence information 734 can include offsets to the particular document occurrence information for each document. As also illustrated in FIG. 7B, node 732 includes an optimized list of occurrence information 736.

Returning to FIG. 5, once the temporary red and black index tree is converted, at block 516, the data parsing/index generation component 126 adjusts shared memory pointers for the inverted keyword index 118 and the inverted keyword attribute index 120. One skilled in the relevant art will appreciate that although multiple components may utilize shared memory, the address of the memory may be different for each component. Because each node in the inverted keyword indices corresponds to a pointer in memory, the data parsing/index generation component 126 adjusts the pointers in the shared memory to correspond to the address utilized by the query processing component 128. To adjust the pointers, the base addresses of the data parsing/index generation component 126 is subtracted from the base address of the query processing component 128. The difference in the base address can be added to the pointers of the red and black index trees. Accordingly, the query processing component can now directly access the indices in memory. At block 518, the sub-routine 500 returns. In an illustrative embodiment of the present invention, the merge process 130 (FIG. 1) may merge the indices from the shared memory 114 with the indices in the disk subsystem 116.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for facilitating full text searching of a set of data, the method comprising:
   obtaining keyword data corresponding to a set of data;
   generating an inverted keyword index and a separate inverted keyword attribute index corresponding to the obtained keyword data, the generated inverted keyword attribute index including information from at least one category within a group consisting of language information, sentence information, ranking information, document timestamp information, and metadata information;
   storing the inverted keyword index and the inverted keyword attribute index in a shared process memory, wherein storing the inverted keyword index includes dynamically adjusting at least one memory pointer of the stored inverted keyword index to correspond to an address of a query processing component;
   obtaining a keyword query from a first process; and
   processing the obtained keyword query by the query processing component, the query processing component accesses the inverted keyword index and the inverted keyword attribute index stored in the shared process memory via the at least one dynamically adjusted memory pointer of the stored inverted keyword index.

2. The method as recited in claim 1, wherein the set of data corresponds to a set of documents.

3. The method as recited in claim 1, wherein the set of data corresponds to a set of rows in a database.

4. The method as recited in claim 1, wherein the generated inverted keyword attribute index corresponds to keyword occurrence information in the set of data.

5. The method as recited in claim 1, wherein the generated inverted keyword index and the generated inverted keyword attribute index correspond to red and black index trees.

6. A computer-readable medium having computer-executable instructions for performing the method recited in claim 1.

7. A computer system including a processor, a memory, and an operating environment, the computer system operable to perform the method recited in claim 1.

8. A system for facilitating full text searching, the system comprising:
   a computer processor;
   one or more processes executed by the processor for issuing keyword queries;
   an index generation component for obtaining a set of data and generating an inverted keyword index and a separate inverted keyword attribute index corresponding to the obtained set of data, the generated inverted keyword attribute index including information from at least one category within a group consisting of language information, sentence information, ranking information, document timestamp information, and metadata information;
   a shared memory buffer for storing the generated inverted keyword index and the generated inverted keyword attribute index, wherein storing the inverted keyword index includes causing an index generation component to dynamically adjust at least one memory pointer of the stored inverted keyword index to correspond to an address of a query processing component; and the query processing component processes keyword queries issued by the executed one or more processes by accessing the inverted keyword index and the inverted keyword attribute index stored in the shared memory buffer via the at least one dynamically adjusted memory pointer of the stored inverted keyword index.

9. The system as recited in claim 8, wherein the generated inverted keyword index corresponds to a set of documents.

10. The method system as recited in claim 8, wherein the set of data corresponds to a set of rows in a database.

11. The system as recited in claim 8, wherein the shared memory buffer includes the generated inverted keyword attribute index corresponding to each node in the inverted keyword index.

12. The system as recited in claim 11, wherein the generated inverted keyword attribute index corresponds to keyword occurrence information in the set of data.

13. The system as recited in claim 11, wherein the generated inverted keyword index and the generated inverted keyword attribute index are red and black index trees.

14. The system as recited in claim 8 further comprising:
a disk subsystem for storing at least a portion of the generated inverted keyword index of a set of data; and
a merge process for merging the inverted keyword index in the shared memory with at least the portion of the inverted keyword index in the disk subsystem.

* * * * *